Oct. 27, 1959 W. R. PLUMMER 2,910,047
FLUID OPERATED CYLINDER AND PISTON ASSEMBLY
Filed Dec. 23, 1957 2 Sheets-Sheet 1
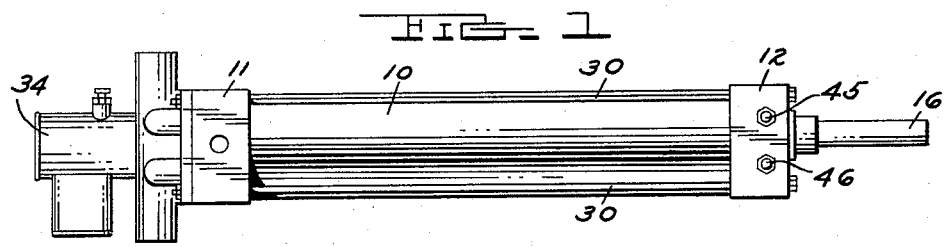
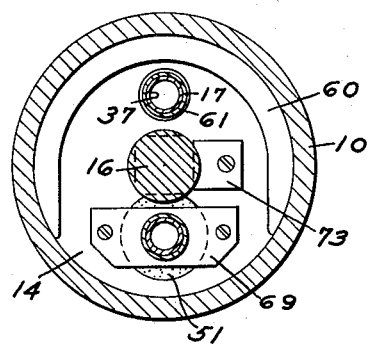
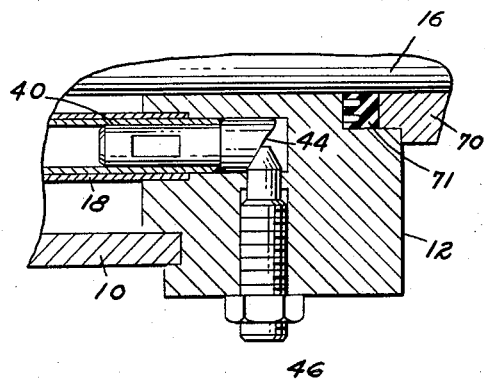
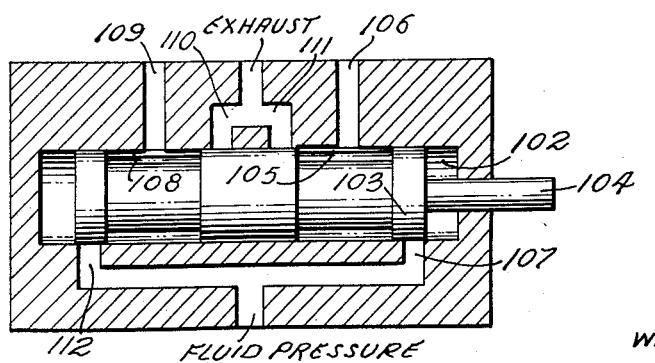
INVENTOR.
WILLIAM R. PLUMMER
BY
ATTORNEY Oct. 27, 1959 W. R. PLUMMER 2,910,047
FLUID OPERATED CYLINDER AND PISTON ASSEMBLY
Filed Dec. 23, 1957 2 Sheets-Sheet 2
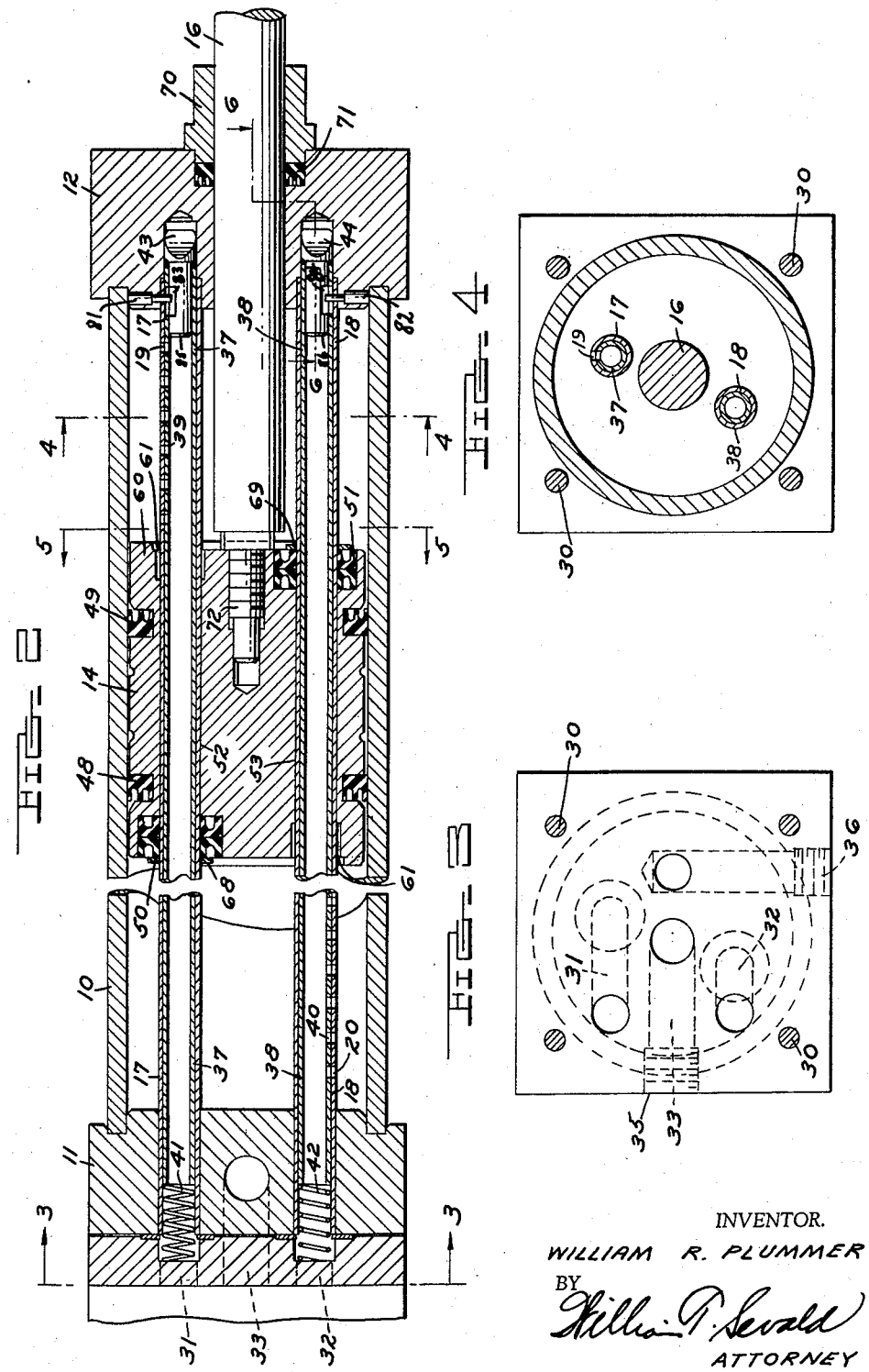
INVENTOR.
WILLIAM R. PLUMMER
BY
ATTORNEY United States Patent Office 2,910,047
Patented Oct. 27, 1959

2,910,047

FLUID OPERATED CYLINDER AND PISTON ASSEMBLY

William R. Plummer, Berkley, Mich.

Application December 23, 1957, Serial No. 704,757

18 Claims. (Cl. 121—38)

This invention relates to a fluid operated cylinder and piston assembly having acceleration, deceleration, throttling, and speed control characteristics, and more particularly pertains to a fluid operated cylinder having supply and exhaust tubes within the cylinder and slidably disposed relative to the piston and equipped with spaced ports adjacent opposite ends of opposed tubes for increasing and decreasing supply and exhaust fluid in conjunction with the travel of the piston.

Fluid operated cylinder and piston assemblies have been employed heretofore to facilitate the application of power, however, the several devices of the prior art have not proven entirely satisfactory inasmuch as they are complicated in design and construction, expensive to manufacture, difficult to use, and are not equipped with means for accelerating, decelerating, and throttling the movement of the piston relative to the cylinder in conjunction with the actual position of the piston relative to the cylinder.

With the foregoing in view, the primary object of the invention is to provide a fluid operated cylinder and piston assembly which is simple in design and construction, inexpensive to manufacture, easy to use, adjust, and repair, and which has means for controlling acceleration, deceleration, throttling, and cushioning based on the actual position of the piston relative to the cylinder.

An object of the invention is to provide paired inlet-outlet tubes within the cylinder slidably disposed in receiving channels of the piston so that the piston slides over the tubes in its movement back and forth in the cylinder with the tubes preventing radial rotational movement of the piston.

An object of the invention is to provide inlet-outlet ports in the tubes at opposite ends of the cylinder with a valve on one end of the cylinder communicating to both tubes and adapted to switch inlet and outlet porting between the tubes to move the piston back and forth in the cylinder thereby eliminating all cumbersome external piping and expensive housing channels.

An object of the invention is to provide paired port tubes connected between the cylinder heads and lying in the cylinder interior parallel to the central axis of the cylinder and penetrating the piston in sliding relationship so that the piston in moving from end to end of the cylinder slidably moves relative to the port tubes with the piston body acting as a stop valve relative to the tube ports in lying over the ports and moving off the ports.

An object of the invention is to provide spaced port apertures in the port tubes adjacent one end thereof with the port orifices of one tube being disposed at an opposite end of the cylinder relative to the port orifices of the other tube.

An object of the invention is to provide an inner tube in each said port tube having port apertures alignable with the port apertures of the port tubes with the inner tubes being movable relative to the port tubes so as to move the port apertures of the inner tubes out of alignment to reduce the cross-sectional area of the partially aligned apertures relative to one another so as to diminish the fluid transmission capacity.

An object of the invention is to provide means for adjusting the inner tubes relative to the port tubes so as to align or mis-align the apertures of each as desired.

These and other objects of the invention will become apparent by reference to the following description of a fluid operated cylinder and piston assembly having port tubes embodying the invention taken in connection with the accompanying drawings in which:

Fig. 1 is a side elevational view of the inventive cylinder assembly showing a four-way valve mounted thereon.

Fig. 2 is an enlarged longitudinal cross-sectional view of the device seen in Fig. 1 with the valve deleted and the intermediate area foreshortened.

Fig. 3 is a cross-sectional view of the device seen in Figs. 1 and 2 taken on the line 3—3 of Fig. 2 showing the valve head channeling in dotted lines.

Fig. 4 is a view similar to Fig. 3 taken on the line 4—4 of Fig. 2 showing the port tube and piston rod association.

Fig. 5 is a view similar to Fig. 3 taken on the line 5—5 of Fig. 2 showing the piston seal retainers and rod retainer.

Fig. 6 is a cross-sectional view of Fig. 2 taken on the line 6—6 thereof showing the inner tube axial adjusting means; and Fig. 7 is a diagrammatic cross-sectional view, partly in elevation, of a suitable valve for alternately connecting the tubes to fluid pressure or exhaust.

Referring now to the drawings wherein like numerals refer to like and corresponding parts throughout the several views, the fluid operated cylinder and piston assembly disclosed therein to illustrate the invention comprises a cylinder 10 having a valve head 11 at one end and a piston rod and adjusting head 12 at the other end with the piston 14 disposed within the cylinder 10 between the heads 11 and 12; the piston 14 is attached to one end of the piston rod 16 and the other end of the rod 16 extends through the head 12. Paired port tubes 17 and 18 extend between the heads 11 and 12 within the cylinder 10 and are slidably disposed in the piston 14 so that the piston 14 slides over the tubes 17 and 18 in moving back and forth in the cylinder 10. The tubes 17 and 18 are provided with longitudinally spaced port apertures 19 and 20 respectively adjacent one end of each tube and the port apertures of one tube are located at one end of the assembly and the ports of the other tube are located at the other end of the assembly so that movement of the piston 14 from one end to the other successively uncovers the ports of the one tube and then successively covers the ports of the other tube as hereinafter more fully set forth. The heads 11 and 12 are held in sealing relationship relative to the cylinder 10 by the tension rods 30 which provide for disassembly of the cylinder for repair and replacement of seals. Obviously, the heads can be welded on the cylinder 10 or otherwise secured, such as by a threaded arrangement if desired.

More particularly, the valve head 11 is provided with paired channels 31 and 32 communicating with the port tubes 17 and 18 respectively at one end and with the four-way valve 34 at the other end while the exhaust channel 33 is connected to the exhaust port of the four-way valve 34; fluid under pressure is furnished to the four-way valve 34 via the intake port 36, and as is well understood in the art of four-way valves, the valve 34 is capable of selectively switching the fluid pressure and exhaust from the channel 31 and the tube 17 to the channel 32 and the tube 18 and vice versa to move the piston 14 back and forth in the cylinder 10 as hereinafter more fully described.

The heads 11 and 12 are sealably fixed to the port tubes 17 and 18 while the inner coaxial tubes 37 and 38 are slidably disposed within the tubes 17 and 18 respectively and also axially slidably disposed relative to the heads 11 and 12 with the springs 41 and 42 in the head 11 resiliently urging the inner tubes 37 and 38 towards the head 12 which is equipped with cams 43 and 44 abutting the ends of the inner tubes 37 and 38 respectively, and adjusting means 45 and 46 for moving the cams 43 and 44 respectively inwardly and outwardly relative to the head 12 so as to axially move the inner tubes 39 and 40 towards and away from the head 11 against the compression of the springs 41 and 42 respectively. The inner tubes 37 and 38 are also provided with longitudinally spaced ports 39 and 40 which are radially indexed with ports 19 and 20 respectively by the pins 81 and 82 lying in grooves 83 and 84 respectively of the cam plugs 85 and 86.

The combined area of the sets of spaced ports 19, 20, 39, and 40 are preferably equal to the cross-sectional area of the tubes 17, 18, 37, and 38 so that the transmission or volume capacity of the ports is equal to the transmission or volume capacity of the tubes so that when the ports 19 and 39 are aligned and the ports 18 and 38 are aligned concentrically the ports have the total volume transfer capacity equal to the tube itself so that the ports in themselves in concentric relationship do not throttle the transmission of fluid.

By moving the inner tubes 37 and 38 relative to the outer tubes 17 and 18 respectively via the cams 43 and 44 and adjusting means 45 and 46, the ports 39 and 40 of the inner tubes are misaligned or out of concentric alignment with the ports 19 and 20 in the outer tubes so that the volume capacity of the ports is lowered below the volume capacity of the tubes thereby providing a throttling action in the ports themselves as to intake and exhaust fluid transmission.

The piston 14 is equipped with seals 48 and 49 in its outer periphery for sealing against the cylinder 10 and the piston is provided also with internal seals 50 and 51 for sealing the area between the piston internal channels 52 and 53 and the outer tubes 17 and 18 respectively, and it is to be noted that the seals 50 and 51 are disposed at the end of the piston adjacent the imperforate end of the tubes 17 and 18 respectively so as to eliminate the seals 50 and 51 riding over the apertures 19 and 20 respectively so as to eliminate wear and cutting of the seals on the apertures.

The piston 14 is preferably provided with a horseshoe-shaped spacer projection 60 at either end and counter-bored channel 61 so that when the piston 14 abuts a head 11 or 12 fluid can be transmitted from the port tube apertures to the end of the piston adjacent the head via the channel 61 and the space provided adjacent the head by the projection 61 so as to permit full piston stroke and ability to move the piston away from the head.

The piston channels 52 and 53 slidably housing the tubes 17 and 18 respectively are preferably closely fitted so that the piston body wall forming the channel can block the flow of fluid from the tube ports when the piston lies over the ports. It is to be noted that the seals 50 and 51 are double and prevent travel of fluid within the piston 14 in both directions along the tubes 17 and 18. The retainer straps 68 and 69 hold the seals 50 and 51 under suitable compression and insure movement of the seals with the piston. The fitting 70 and seal 71 seal the piston rod aperture in the head 12 while permitting the movement of the piston rod 16 which is shown threaded in the piston 14 as by the threads 72 and relative turning is prevented by the block 73.

A suitable valve 100, Fig. 7, for alternately connecting the tubes 17 and 18 to either exhaust or fluid pressure supply comprises a housing 101 having a chamber 102 housing the slide valve piston 103 which is operated manually or by power via the stem 104 and as shown the system is at rest. When it is desired to connect the tube 18 to the fluid pressure and the tube 17 to exhaust the slide piston 103 is moved to the right as shown so that the passage 105 lies between the tube 18 part 106 and the fluid pressure part 107 on the one hand and the passage 108 lies between the tube 17 part 109 and exhaust part 110 on the other hand. When it is desired to connect the tube 17 to fluid pressure and the tube 18 to exhaust, the slide piston 103 is moved to the left as shown so that the passage 105 lies between the exhaust part 111 and part 106 to tube 18 on the one hand and passage 108 lies between fluid pressure part 112 and part 109 leading to tube 17 on the other hand. By centrally locating the piston 103 the system lies at rest.

In operation, fluid under pressure is supplied to the four-way valve 34 via intake port 36 and channelled by the position of the valve to the channel 31 and tubes 17 and 37 as shown in the intake condition. When the piston 14 starts to move toward the head 11 from a position adjacent the head 12, it will be noted that the ports 20 and 40 in the exhaust side are completely open and not covered by the piston 14 body so that complete exhaust communication to the exhaust channel 33 and atmosphere is available through the channel 32 and the four-way valve 34 and exhaust port 35. Upon further movement of the piston 14 toward the head 11, more ports 19 and 39 in the tubes 17 and 37 are opened successively and progressively as the piston 14 moves thereby providing more volume communication on a gradually increased basis so as to accelerate the movement of the piston to a final full speed of movement when all the ports are uncovered by the piston moving off the ports so that the piston then is under full accelerated speed of movement by the full input and outlet of fluid pressure in the travel until the piston 14 approaches the head 11 and starts to move over the ports 20 and 40 so as to block these ports which are in the exhaust side of the system at the time. As the piston 14 moves over the ports 20 and 40 the volume of exhaust fluid is cut down until as the piston approaches close to the head 11 only the last single paired ports 20 and 40 are open so that in the final movement of the piston toward the head 11 the speed of the piston is decelerated by the inability of the fluid to escape and this deceleration is progressive as volume of fluid capable of being exhausted is decreased as the piston approaches the head 11 by its successive movement over more ports 20 and 40 thereby cushioning the piston movement at the end of its stroke.

Conversely, upon the piston 14 coming to rest at the head 11 end of the cylinder 10, the four-way valve 34 is switched so as to introduce fluid under pressure from the valve inlet port 36 to the channel 32 and inner and outer tubes 18 and 38 while the switching action of the valve 34 has connected the tubes 17 and 37 via the port 31 through the valve 34 to the exhaust channel 33 and atmosphere so that fluid is now introduced behind the piston at the head 11 via the closest ports 20 and 40 thereto and the piston then starts to move toward the head 12 and in its movement progressively and successively uncovers more ports 18 and 20 thereby permitting increased fluid to be fed behind the piston to accelerate its movement toward the head 12 until it has moved off all the ports 20 and 40 in the tubes 18 and 38 and achieves its full speed toward the head 12, whereupon as it approaches the head 12 it moves over and covers the ports 19 and 39 connected to the exhaust side and successively and progressively covers these ports so as to decrease the volume capacity of fluid being evacuated from the head 12 side of the piston until the piston 14 approaches the head 12 thereby leaving only the last ports 19 and 30 partially open so as to completely decelerate the movement of the piston 14 toward the head 12 as it approaches adjacent thereto thereby cushioning the piston movement at the end of its stroke.

It is obvious that the aperture size of the ports 19, 39, 30, and 40 can be graduated over their longitudinal extent or a few large ports provided or a greater number of small ports provided to suit the characteristics of the movement desired to be achieved in the piston relative to slow acceleration and deceleration or fast acceleration and deceleration or gradual or sudden cushioning.

The overall speed of movement, acceleration, deceleration, and cushioning can be adjusted in any of the inventive devices as shown by means of the adjusting means 45 and 46 and cams 43 and 44 moving the inner tubes 17 and 18 against the springs 41 and 42 so as to move the ports 39 and 40 of the tubes 37 and 38 respectively out of concentric alignment with the ports 19 and 20 in the outer tubes 17 and 18 respectively so as to cut down maximum transmission capacity to an amount desired such as an absolute minimum.

It is also obvious that the size of the tubes can be coordinated to give a large or small transmission capacity for any specific application for specific speed of the piston desired in conjunction with the fluid pressure and type of fluid being used.

The inventive fluid cylinder and piston assembly with these features constitutes a compact, durable, neat appearing mechanism which is completely adjustable and provides acceleration, deceleration, and cushioning characteristics relative to the travel of the piston in the cylinder under fluid pressure, and it is also obvious that the device can be easily disassembled for repair so that it can be maintained in the peak of working condition.

While the movement of the one tube relative to the other tube to adjust the parts of one tube relative to the other has been shown and described as axial sliding movement, it is to be understood that relative radial rotation movement will also achieve the same result and is considered a mechanical equivalent as is also integrating the inner tube stationary and moving the outer tube. Also, a bolt can be axially positioned on the plugs 85 and 86 and the bolt axially adjusted by lock nuts.

Although but a single embodiment of the invention has been shown and described in detail, it is obvious that many changes may be made in the size, shape, detail, and arrangement of the various elements of the invention within the scope of the appended claims, and it is also obvious that the device has great utility and novelty when only the outer tubes 17 and 18 are used such as when it is considered unnecessary to later adjust the volume capacity of the ports. It is also obvious that the use of the inner tubes in sliding relationship relative to the outer tubes for the purpose of adjusting the total transmission capacity is novel and inventive.

I claim:

1. A piston, cylinder, and supply-exhaust tube assembly having throttling, acceleration, deceleration, and cushioning characteristics in conjunction with applied fluid pressure and suitable channels and supply-exhaust switch valving such as a four-way valve comprising a cylinder having a longitudinal axis, a piston in said cylinder having at least two longitudinal slide channels paralleling said axis, heads on either end of said cylinder confining said piston therein, fluid supply-exhaust tubes in said cylinder paralleling said axis lying sealably-slidably in said piston channels and supported between said heads; one said tube having at least one side wall port adjacent one said head and said other tube having at least one side wall port adjacent said other head; said piston being adapted to move back and forth in said cylinder over said tubes between said heads so as to uncover one said tube port in moving away from one said head and to cover said other tube port in moving toward the other said head.

2. In a device as set forth in claim 1, at least one head having supply-exhaust channels leading to said tubes for supplying and exhausting fluid from said tubes via said tube ports.

3. In a device as set forth in claim 1, at least one valve on one said head adapted to switch fluid supply and exhaust between said channels leading to said tubes so as to alternate fluid supply and exhaust between said tubes to effect moving said piston back and forth in said cylinder between said heads.

4. In a device as set forth in claim 1, at least one said tube having multiple longitudinally spaced adjacent one head so that said piston in moving away from and toward said head uncovers and covers one said port after another to respectively increase volume of fluid supply and decrease volume of fluid exhaust.

5. In a device as set forth in claim 1, each said tube having multiple longitudinally spaced ports adjacent opposite heads so that as said piston moves away from one said head it uncovers successively and progressively one said port after another in one tube on the supply side so as to provide increased volume of supply fluid to accelerate said piston speed, and so that as said piston approaches said other head it covers successively and progressively one said port after another in the other tube on the exhaust side so as to decrease volume of exhaust fluid to decelerate said piston speed.

6. In a device as set forth in claim 1, an inner tube disposed in each said tube having at least one port adapted to be aligned with or misaligned with the ports of said tubes and means for moving one said tube or inner tube relative to the other.

7. In a device as set forth in claim 1, an inner tube disposed in each said tube having at least one port aligned in one plane with each said tube port, and means for moving said inner tubes relative to said tubes in an opposed plane to obtain concentric alignment of the ports of said tubes or misalignment of the ports of said tubes as desired.

8. In a device as set forth in claim 1, an inner tube disposed in each said tube having at least one port radially aligned with each said tube port, and means for axially moving said inner tubes relative to said tubes to concentrically align the ports of said tubes to obtain and permit maximum port fluid transmission or to mis-align the ports of said tubes to obtain and permit less than maximum port fluid transmission as desired.

9. In a device as set forth in claim 8, said means comprising a spring at one end of each said inner tube urging said inner tube in one direction and a cam at the other end of each said tube adapted to move said tube against said spring in the opposite direction.

10. A piston, cylinder, and porting assembly having throttling acceleration, deceleration, and cushioning characteristics in conjunction with applied fluid pressures and suitable valving comprising a cylinder having opposite ends, a rod head on one end of said cylinder having an axial piston rod aperture and two port tube sockets, a valve head on the other end of said cylinder for receiving a valve connection having port orifice sockets adapted to receive port tubes; each said socket of said heads being paired and axially aligned with a socket of the other head; a piston disposed in said cylinder, a piston rod on said piston extending through the rod aperture of said rod head; said piston having port tube slide channels axially aligned and paired with said heads paired port sockets, paired port tubes having supply-exhaust ports at opposite ends disposed in said paired head sockets and piston channels having a suitable internal volume capacity for supplying and exhausting fluid to and from said cylinder on either side of said cylinder.

11. In a device as set forth in claim 10, a four-way valve on said valve head adapted to switch supply and exhaust of fluid between said tubes to power said piston.

12. In a device as set forth in claim 10, said piston having seals acting against said cylinder and seals surrounding said tubes; said tube seals on each said tube being disposed on the side of said piston opposite to the port orifices of said tube to eliminate said seal riding over said ports to prevent wear on said seals.

13. In a device as set forth in claim 10, inner tubes in said port tubes having orifices normally aligned with said port tube orifices; and means for moving said inner tubes relative to said tubes so as to misalign said inner tube orifices so as to diminish the area of fluid transmission to effect throttling.

14. In a device as set forth in claim 13, said means comprising springs urging said inner tubes in one direction and adjustable cams urging said tubes in the other direction.

15. A piston, cylinder, and supply-exhaust tube assembly having throttling, acceleration, deceleration, and cushioning characteristics in conjunction with applied fluid pressure and suitable channels and supply-exhaust switch valving such as a four-way valve comprising a cylinder having a longitudinal axis, a piston in said cylinder having at least two longitudinal slide channels paralleling said axis, heads on either end of said cylinder confining said piston therein, fluid supply-exhaust tubes in said cylinder paralleling said axis lying sealably-slidably in said piston channels and supported between said heads; one said tube having at least one side wall port adjacent one said head and said other tube having at least one side wall port adjacent said other head; said piston being adapted to move back and forth in said cylinder over said tubes between said heads so as to uncover one said tube port in moving away from one said head and to cover said other tube port in moving toward the other said head; at least one head having supply-exhaust channels leading to said tubes for supplying and exhausting fluid from said tubes via said tube ports; at least one valve on one said head adapted to switch fluid supply and exhaust between said channels leading to said tubes so as to alternate fluid supply and exhaust between said tubes to effect moving said piston back and forth in said cylinder between said heads; a piston rod extending through one said head connected to said piston; each said tube at one end thereof having multiple longitudinally spaced ports adjacent opposite heads so that as said piston moves away from one said head it uncovers successively and progressively one said port after another in one tube on the supply side so as to provide increased volume of supply fluid to accelerate said piston speed, and so that as said piston approaches said other head it covers successively and progressively one said port after another in the other tube on the exhaust side so as to decrease volume of exhaust fluid to decelerate said piston speed; said piston having opposite ends having a counterbore channel in each said slide channel facing the port end of each said tube and a projection on each said end for contacting said head to provide fluid space at both heads and communication to said tube port; an inner tube disposed in each said tube having at least one port radially aligned with each said tube port, and means for axially moving said inner tubes relative to said tubes to concentrically align the ports of said tubes to obtain and permit maximum port fluid transmission or to mis-align the ports of said tubes to obtain and permit less than maximum port fluid transmission as desired; said means comprising a spring at one end of each said inner tube urging said inner tube in one direction and a cam at the other end of each said tube adapted to move said tube against said spring in the opposite direction.

16. A piston, cylinder, and supply-exhaust tube assembly having throttling, acceleration, deceleration, and cushing characteristics in conjunction with applied fluid pressure and suitable channels and supply-exhaust switch valving such as a four-way valve comprising a cylinder having a longitudinal axis, a piston in said cylinder having at least two longitudinal slide channels paralleling said axis, heads on either end of said cylinder confining said piston therein, fluid supply-exhaust tubes in said cylinder paralleling said axis lying sealably-slidably in said piston channels and supported between said heads; one said tube having at least one side wall port adjacent one said head and said other tube having at least one side wall port adjacent said other head; said piston being adapted to move back and forth in said cylinder over said tubes between said heads so as to uncover one said tube port in moving away from one said head and to cover said other tube port in moving toward the other said head; at least one head having supply-exhaust channels leading to said tubes for supplying and exhausting fluid from said tubes via said tube ports; at least one valve on one said head adapted to switch fluid supply and exhaust between said channels leading to said tubes so as to alternate fluid supply and exhaust between said tubes to effect moving said piston back and forth in said cylinder between said heads; a piston rod extending through one said head connected to said piston; at least one said tube having multiple longitudinally spaced ports adjacent one head so that said piston in moving away from and toward said head uncovers and covers one said port after another to respectively increase volume of fluid supply and decrease volume of fluid exhaust.

17. In a device as set forth in claim 16, an inner tube disposed in each said tube having at least one port adapted to be aligned with or misaligned with the ports of said tubes and means for moving one said tube or inner tube relative to the other said tube.

18. A piston, cylinder, and supply-exhaust tube assembly having throttling, acceleration, deceleration, and cushioning characteristics in conjunction with applied fluid pressure and suitable channels and supply-exhaust switch valving such as a four-way valve comprising a cylinder having a longitudinal axis, a piston in said cylinder having at least two longitudinal slide channels paralleling said axis, heads on either end of said cylinder confining said piston therein, fluid supply-exhaust tubes in said cylinder paralleling said axis lying sealably-slidably in said piston channels and supported between said heads; one said tube having at least one side wall port adjacent one said head and said other tube having at least one side wall port adjacent said other head; said piston being adapted to move back and forth in said cylinder over said tubes between said heads so as to uncover one said tube port in moving away from one said head and to cover said other tube port in moving toward the other said head; one said head having supply-exhaust channels leading to said tubes for supplying and exhausting fluid from said tubes via said tube ports constituting a valve head; a four-way valve on one said valve head adapted to switch fluid supply and exhaust between said channels leading to said tubes so as to alternate fluid supply and exhaust between said tubes to effect moving said piston back and forth in said cylinder between said heads; a piston rod extending through said other head connected to said piston; each said tube at one end thereof having multiple longitudinally spaced ports adjacent opposite heads so that as said piston moves away from one said head it uncovers successively and progressively one said port after another in one tube on the supply side so as to provide increased volume of supply fluid to accelerate said piston speed, and so that as said piston approaches said other head it covers successively and progressively one said port after another in the other tube on the exhaust side so as to decrease volume of exhaust fluid to decelerate said piston speed; an inner tube disposed in each said tube having ports radially aligned with each said tube port, and means for axially moving said inner tubes relative to said tubes to concentrically align the ports of said tubes to obtain and permit maximum port fluid transmission or to mis-align the ports of said tubes to obtain and permit less than maximum port fluid transmission as desired; said means comprising a spring at one end of each said inner tube urging said inner tube in one direction and a cam at the other end of each said tube adapted to move said tube against said spring in the opposite direction.

References Cited in the file of this patent

UNITED STATES PATENTS

| | | |
|---|---|---|
| 685,563 | Botts | Oct. 29, 1901 |
| 1,056,616 | Wright | Mar. 18, 1913 |
| 2,212,998 | Crane | Aug. 27, 1940 |
| 2,810,370 | Fox | Oct. 22, 1957 |